United States Patent [19]

Konovalov et al.

[11] 3,962,594

[45] June 8, 1976

[54] ROTOR WINDING OF ELECTRIC MACHINES

[76] Inventors: Boris Leonidovich Konovalov, 603 mikroraion, 1, kv. 346; Evgeny Khaimovich Glider, ulitsa Beketova, 19/13, kv. 40; Oleg Borisovich Gradov, ulitsa Kosiora, 6, kv. 64; David Bentsionovich Karpman, ulitsa Frantisheka Krala, 49, kv. 54; Boris Volkovich Spivak, ulitsa Kosiora, 56, kv. 55; Alexandr Abramovich Chigirinsky, ulitsa Kuibysheva, 11, kv. 8; Vasily Semenovich Kildishev, ulitsa Plekhanovskaya, 41/43, kv. 55, all of Kharkov, U.S.S.R.; Genrikh Nukhimovich Linetsky, deceased, late of Kharkov, U.S.S.R.; by Ella Semenovna Linetskaya, administrator, 606 mikroraion 17, kv. 92, Kharkov, U.S.S.R.

[22] Filed: May 5, 1975

[21] Appl. No.: 574,469

Related U.S. Application Data

[63] Continuation of Ser. No. 429,396, Dec. 28, 1973, abandoned.

[52] U.S. Cl. .................................................. 310/61
[51] Int. Cl.² ........................................... H02K 1/32

[58] Field of Search ................. 310/54, 53, 55, 52, 310/56, 57, 58, 59, 60, 61, 64, 65

[56] References Cited
UNITED STATES PATENTS

| | | | |
|---|---|---|---|
| 3,131,321 | 4/1964 | Gibbs | 310/64 |
| 3,504,207 | 3/1970 | Irsta | 310/54 |
| 3,686,522 | 8/1972 | Konovalov | 310/59 |
| 3,749,952 | 7/1973 | Lambrecht | 310/54 |

*Primary Examiner*—R. Skudy
*Attorney, Agent, or Firm*—Holman & Stern

[57] ABSTRACT

A rotor winding of an electric machine, the coil ends of which are provided with coolant conduits for supplying thereto a cooling liquid. The coolant conduits have radial and axial portions the axial portions being disposed in axial slots of the rotor shaft. The coolant conduits are fixedly secured with respect to the coil ends of the rotor winding by means of insulating supporting blocks at positions where the radial portions of the conduits bend into the axial portions thereof, the end parts of the axial portions being fixedly secured by means of insulating gaskets at a predetermined distance from the position of the supporting insulating blocks. This method of securing the coolant conduits provides considerable reduction of stresses caused therein by radial displacements of the tread ring with respect to the rotor shaft, and by centrifugal forces.

1 Claim, 2 Drawing Figures

ROTOR WINDING OF ELECTRIC MACHINES

This is a continuation of application Ser. No. 429,396 filed Dec. 28, 1973, now abandoned.

The present invention relates to windings of electric machines and, more particularly, to a rotor winding of an electric machine.

Rotor windings of electric machines, in particular of turbo-generators, having water cooling are known in the art.

The rotor winding consists of separate coils, and the coil ends of the winding are secured by means of tread rings fitted onto the rotor barrel.

The coil ends of the winding are provided with coolant conduits disposed radially to the axis of the rotor shaft, which are then arranged axially in the axial slots on the shaft. Thus each of the coolant conduits have a radially disposed portion passing into an axially disposed portion, the portions being rigidly secured in the slots on the rotor shaft at the point of transition at which the radial portion of the conduit bends into the axial portion thereof.

In rotors having thread rings fitted onto the barrel for holding the coil ends of the windings, the coolant conduits are subjected to inadmissible stresses due to centrifugal forces and deflection of the rotor shaft, which may result in failure of the conduit in places of rigid attachment thereof.

The object of the present invention is to eliminate the above disadvantage.

The present invention is directed to the provision of a rotor winding of an electric machine having a reliable arrangement of coolant conduits.

This object is achieved in a rotor winding of an electric machine, the coil ends of which have coolant conduits arranged in the axial slots of the rotor shaft, wherein, according to the present invention, the coolant conduits are stationarily secured in relation to the coil ends of the rotor winding, at the point transition of their radial portions into axial portions thereof, whereas the end parts of the axial portions of the coolant conduit are stationarily secured with respect to the rotor shaft, at a predetermined distance from the point of transition where the radial portion of the coolant conduit bends into the axial portion thereof.

It is expedient to secure the coolant conduits at the above-mentioned point of transition by means of supporting insulating blocks inserted between the axial portion of the coolant conduit and the coil end of the rotor winding, and to fix the end parts of the conduits in the axial slots of the rotor shaft at a predetermined distance from the inserted supporting blocks by means of insulating gaskets accomodated in the axial slots of the shaft.

BRIEF DESCRIPTION OF THE DRAWINGS

The invention will be better understood from a more detailed description of a rotor winding of an electric machine according to the invention, with reference to the accompanying drawings, wherein.

DETAILED DESCRIPTION OF THE PREFERRED EMBODIMENTS

Figure 1:
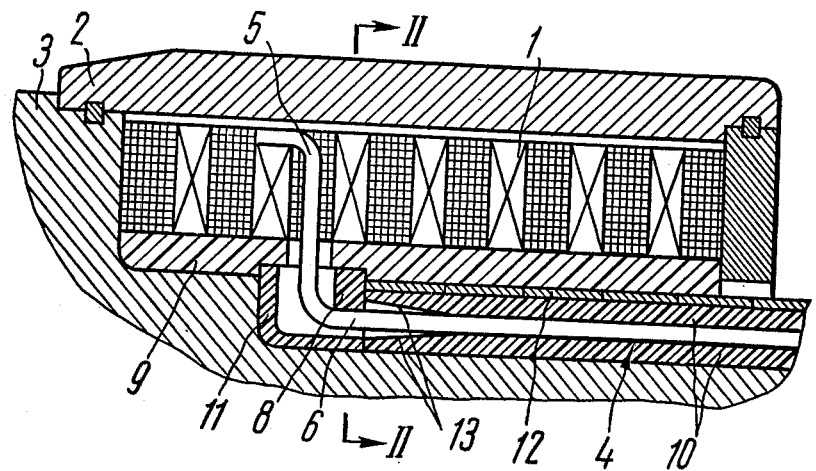
FIG. 1 shows a rotor winding of an electric machine of the present invention, provided with coolant conduits running from the coil ends.

Referring now to the Figures, the rotor winding of an electric machine is provided with a coil end 1 secured by means of a tread ring 2 fitted from one side onto a barrel 3 of the rotor shaft.

Coolant conduits 4 from the coil ends 1 each include radial portions 5 and axial portions 6. The axial portions 6 of the coolant conduits 4 are accomodated in axial slots 7 formed in the body of the rotor shaft.

Supporting insulated blocks 8 are inserted at the points of transition of the cooling conduits 4 from the radial portions 5 into the axial portions 6. One side of the blocks 8 thrust against the axial portions 6 and the other sides thereof thrust against an insulating gasket 9 which, in turn, thrusts against the tread ring 2 through the respective coil ends 1 of the winding. Due to provision of the supporting 8, the axial portion 6 of the coolant conduit is radially displaceable at the above-mentioned transition point, by a predetermined distance which is equal to the displacement of the tread ring 2 with respect to the rotor shaft during its rotation, thereby removing the weight of radial portion 5 from the centrifugal forces produced by rotation of the rotor.

Figure 2:
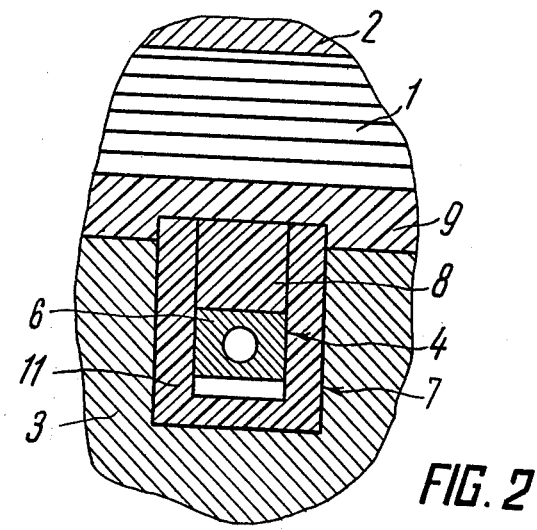
FIG. 2 is a section along the line I — I in FIG. 1.

The axial portions 6 (FIG. 2) of the coolant conduits 4 are fixedly secured in the slots 7 by means of insulating gaskets 10 and wedges 12 in relation to the rotor shaft, at a predetermined distance from the supporting block 8.

Insulating seats 11 in which the insulating supporting blocks 8 are inserted, are mounted in the axial slots 7 at the above-mentioned transition points of the cooling conduit 4. The coolant conduit 4 is mounted in the seat 11 movably in a radial direction, thereby providing free displacement thereof during movement of the tread ring 2.

The insulating gaskets 10 disposed along the portion between the supporting block 8 and the point where the axial portion 6 of the coolant conduit 4 is rigidly secured, are provided with chamferings 13. Since the position at which the axial portion 6 of the coolant conduit 4 is fixedly secured in the slot 7 is disposed at a predetermined distance from the place of mounting of the supporting block 8, considerable relief of stresses developing in the axial portion is ensured also thereby stresses in the radial portion 5 of the coolant conduit 4 caused by the forces developing due to the radial displacement of the tread ring 2 together with the coil end 1 of the winding in relation to the rotor shaft, are much reduced.

Therefore, the structure of the rotor winding having the coolant conduits 4 secured according to the present invention ensures considerable reduction of the stresses in the coolant conduits caused by the radial displacements of the tread ring and by centrifugal forces generated during rotation of the rotor.

What is claimed is:

1. In an electric machine having a rotor shaft, a plurality of axial slots formed in said shaft, a rotor winding having coil ends disposed circumferentially about said shaft, a plurality of cooling conduits for supplying said winding with a cooling liquid, and a tread ring disposed circumferentially about said coil ends, said cooling conduits having radial and axial portions with respect to said shaft, said axial portions positioned within said axial slots, the points at which said axial portions meet said radial portions defining a transition point of said conduits, the improvement which comprises means for reducing stresses on said cooling conduits which comprises: a first insulating gasket positioned between said coil ends and said axial slots; a supporting insulating block positioned between said first insulating gasket and an axial portion of each of said cooling conduits near said transition point so as to permit radial displacement of said radial portion of said cooling conduit; and a plurality of second insulating gaskets each of which is disposed within one of said axial slots about one of said conduits, the axial portion of each conduit fixedly contacting its associated second insulating gasket a predetermined distance from said transition point so as to further relieve stresses on said axial and radial portions of said cooling conduits.

* * * * *